Oct. 18, 1966 D. GOLD 3,279,012

LINK CONNECTOR FOR PARACHUTE HARNESSES

Original Filed June 7, 1963

INVENTOR

David Gold

BY *Rommel, Allwein and Rommel*

ATTORNEYS

United States Patent Office 3,279,012
Patented Oct. 18, 1966

---

3,279,012
LINK CONNECTOR FOR PARACHUTE HARNESSES
David Gold, Tujunga, Calif., assignor to Irving Air Chute Company, Inc., Lexington, Ky., a corporation of New York
Original application June 7, 1963, Ser. No. 286,898, now Patent No. 3,154,272, dated Oct. 27, 1964. Divided and this application June 30, 1964, Ser. No. 379,149
3 Claims. (Cl. 24—73)

This application is a division of application Serial No. 286,898, filed June 7, 1963, which has resulted in the grant of U.S. Patent 3,154,272, dated October 27, 1964.

This invention relates to a link connector for parachute harnesses and has more particular reference to the construction of a link which enables ease of parachute harness adjustment and fit, and safe application of the harness upon the body of a parachutist.

A further object of this invention is the provision of a link connector for parachute harnesses which is offset to one side thereof in such a manner as to enable safe and comfortable attachment of the various harness straps whereby the harness webbing portions will have maximum freedom of movement to conform to the body movements and stature of the parachutist.

A further object of this invention is the provision of an offset link connector for parachute harnesses which will enable the straps or webs of a parachute harness to adjust readily to the body of a parachutist. Previously it was found that different sized seat slings were necessary to fit hip and other measurements of the torso of the parachutist. With the improved link connector however it is now possible to use a single sized seat sling assembly to fit different sized parachutists.

Other objects and advantages of this invention may be apparent during the course of the following detailed description.

In the accompanying drawing, forming a part of this specification and wherein similar reference characters designate corresponding parts throughout the several views.

Figure 1:
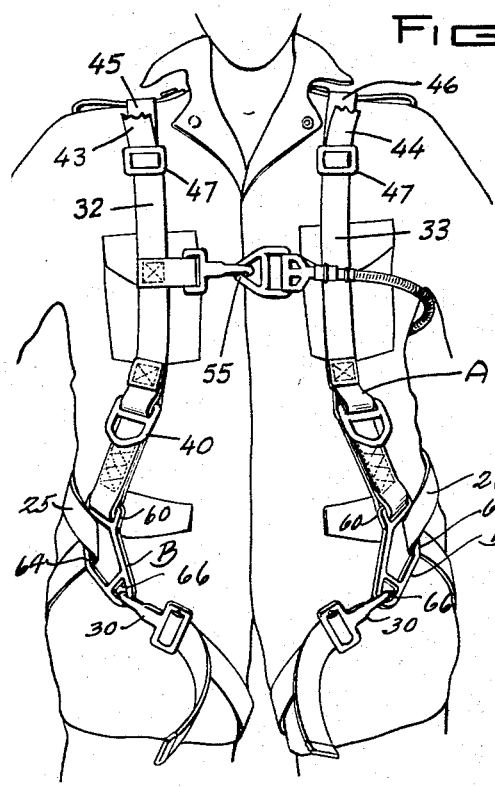
FIGURE 1 is a front elevation of the harness specifically described and set forth in U.S. Patent 3,154,272, above identified, showing the improved link connectors attached therewith in torso enclosing position upon the body of a wearer.
Figure 3:
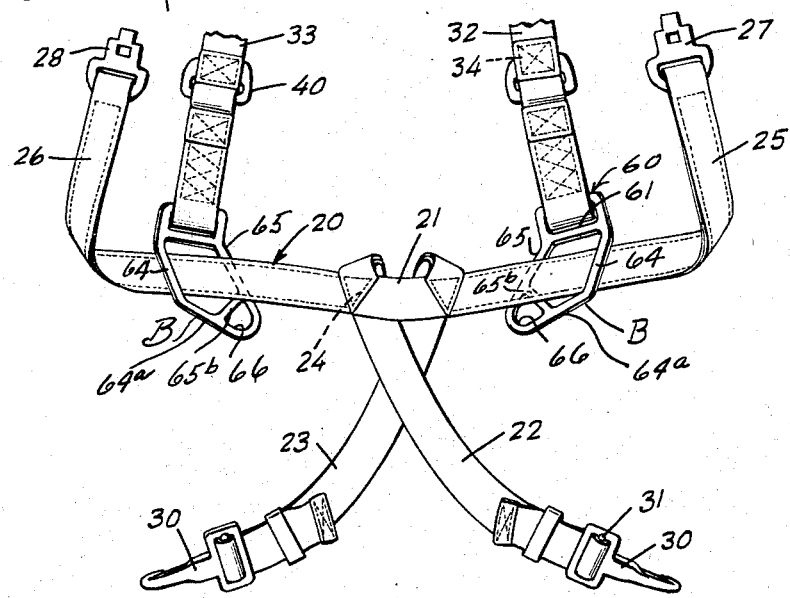
FIGURE 3 is a developed view of a sling portion of the parachute harness looking from the rear thereof and showing the association of the improved link connectors with the seat sling, riser webs and leg straps.

In the drawing, wherein for the purpoes of illustration is shown a preferred embodiment of the invention, the letter A generally designates the harness, more specifically described in U.S. Patent 3,154,272, above identified. The views, FIGS. 1 and 3, show sufficient characteristic parts of the improved harness A and their association with the improved link connector B. The harness A includes a flexible seat sling 20 of the type of webbing, nylon or equal, conventionally used for harness seat slings. It may be reinforced in any approved manner. It includes an intermediate seat portion 21 to which right and left flexible leg straps 22 and 23 are secured as by stitching 24. The seat sling includes the right and left end portions 25 and 26 having fittings 27 and 28 at the ends thereof adapted to cooperate with fastener boxes located on the back of a wearer (not shown) and which have been specifically set forth in the co-pending application above mentioned.

The leg straps 22 and 23 are provided with conventional snap fasteners 30 having ring portions and movable bars 31 through which the adjusting ends of the straps are threaded in a manner well known in the parachute art and more particularly shown in U.S. Patents 2,516,004; 2,405,671; 2,192,083 and 2,542,044.

The harness A furthermore includes flexible right and left lift webs 32 and 33 the lower ends of which are doubled upon themselves and stitched at 34. They are threaded through slots 61 of the improved offset link connectors B. The ends 25 and 26 of the sling seat 20 are adapted to be adjustably and releasably threaded through the links B. The lift webs 32 and 33 are provided with outstanding coupling rings 40 for detachably receiving a conventional emergency or reserve pack as set forth in the above identified co-pending United States application. The lift webs 32 and 33 extend upwardly and terminate in riser webs 43 and 44 which also extend upwardly and are connected to the shroud lines of the parachute canopy in a manner well understood in this art.

Right and left shoulder straps or webs 45 and 46 are connected by means of adjustable adapters 47 of well known construction, mounted on the upper ends of the lift webs 32 and 33. Continuous with these shoulder straps are right and left riser webs for attachment to the shroud lines of the parachute canopy as set forth in the above identified co-pending application. The lift webs 32 and 33 above the emergency pack connector rings 40 are connected by a front breast strap construction 55.

Figure 4:
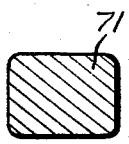
FIGURE 4 is an enlarged cross sectional view taken substantially on the line 4—4 of FIG. 2.

The rigid offset link B consists of an upper portion 60 of polygonal ring-shaped formation defining an elongated straight line opening 61 formed by the straight upper and lower bars 62 and 63, connected together at their ends by right angled bar portions 70 and 71. FIG. 4 shows the cross sectional structure of the bar, which may be polygonal, rounded or of any approved cross sectional shape. The slot 61 is intended to receive the lower end of a lift web 32 or 33 of the harness, as shown in the drawing. Usually the slot 61 lies at an acute angle to the horizontal. The link B from the bar 63 is provided with spaced side bars 64 and 65 of straight line formation which are in acute angled relation with respect to the run of the slot 61, extending either to the right or left, depending upon whether the link is for the right or left lift webbing.

Figure 2:
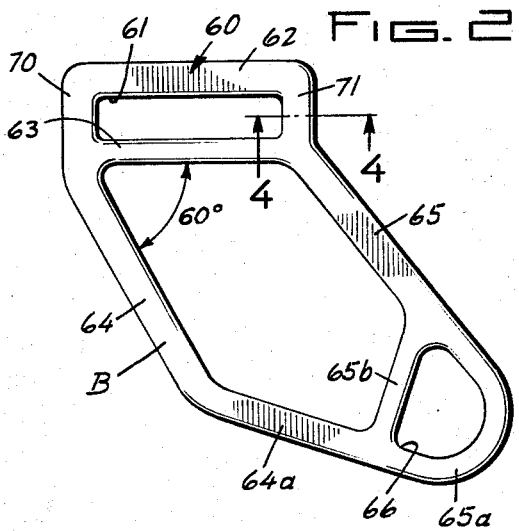
FIGURE 2 is a front elevation of a link connector showing the structural shape thereof.

In FIG. 2 it is shown that the bar 64 is located at an angle of about 60° with respect to the run of slot 61, or 60° with respect to the bar 63. The bar 65 is not exactly parallel to the bar 64, but slightly diverges away therefrom in the direction of the lower end of the link. The bar 64 at its lower end is continued at 64ᵃ in a straight length portion in obtuse angled relation with respect to the run of the bar 64. This bar 64ᵃ extends in convergent relation to the bar 65. The bars 64ᵃ and 65 terminate in a leg strap ring 65ᵃ at their juncture having an opening 66 for receiving a snap fastener 30 of a leg strap. When the harness is upon the wearer, the bar portion 64 is usually upright or in substantial vertical position and receives thereabout an end portion 25 or 26 of the sling seat in order to best conform the sling seat to the size of the wearer and enable the strap ends to readily slide through the links B, and free themselves from the links at the time of harness release action. The links B are toed inwardly at the front of the wearer as shown in FIG. 1 when the harness is worn by the wearer to enable a comfortable and a natural attachment of the leg strap snap fasteners to the ring portion. The ring portion 65ᵃ includes a straight line bar portion 65ᵇ extending from the intermediate portion of the bar 65 to the intermediate portion of the bar 64ᵃ, and the remaining portion of the ring 65ᵃ is arcuately formed to define the opening 66.

Various changes in the size, shape and arrangement of parts may be made to the form of invention herein shown and described without departing from the spirit of the invention or scope of the claims.

I claim:

1. As an article of manufacture an offset link connector for parachute harnesses comprising a rigid bar-type fitting, shaped to include a slotted upper harness riser web attaching portion, said fitting including elongated side bar portions connected at the ends of said attaching portion and disposed in sidewise acute angled relation with respect to the upper portion and defining a single elongated opening paralleling said side bars for receiving a sling seat harness strap, said sidewise angled bars having a snap fastener receiving ring portion at the juncture ends thereof, all of said bars lying in the same plane.

2. An offset link connector for parachute harnesses as defined in claim 1 in which one of said elongated side bars is divided into two bar portions which are relatively disposed in obtuse angled relation, the last mentioned bar portion which is most remote from said attaching portion being disposed in acute angled relation with respect to the other elongated side bar portion.

3. The offset link connector as defined in claim 2 in which the snap fastener receiving ring includes a straight cross bar portion connecting with the obtusely angled bar portion, said elongated side bar portions at their ends most remote from said attaching portion and beyond said cross bar portion being convexly curved to define said snap fastener receiving ring portion.

References Cited by the Examiner

UNITED STATES PATENTS

| | | | |
|---|---|---|---|
| 408,661 | 8/1889 | Kennett | 54—87 |
| 438,182 | 10/1890 | Regan | 54—87 |
| 539,533 | 5/1895 | McCahan | 54—56 |
| 681,766 | 9/1901 | Williams | 24—236 |
| 1,122,807 | 12/1914 | Sessions | 54—87 |
| 1,541,701 | 6/1925 | Gaunt | 24—73 |

WILIAM FELDMAN, *Primary Examiner.*

E. SIMONSEN, *Assistant Examiner.*